US008566338B2

(12) United States Patent
Cragun et al.

(10) Patent No.: US 8,566,338 B2
(45) Date of Patent: Oct. 22, 2013

(54) AUTOMATICALLY MAKING CHANGES IN A DOCUMENT IN A CONTENT MANAGEMENT SYSTEM BASED ON A CHANGE BY A USER TO OTHER CONTENT IN THE DOCUMENT

(75) Inventors: Brian John Cragun, Rochester, MN (US); John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 11/858,983

(22) Filed: Sep. 21, 2007

(65) Prior Publication Data

US 2009/0083247 A1 Mar. 26, 2009

(51) Int. Cl.
*G06F 7/76* (2006.01)
*G06F 7/06* (2006.01)

(52) U.S. Cl.
USPC .......................................... 707/765; 707/775

(58) Field of Classification Search
USPC .......... 707/748, 749, 751, 999.101, 765, 766, 707/767, 768, 775
See application file for complete search history.

(56) References Cited

U.S. PATENT DOCUMENTS

| | | | | |
|---|---|---|---|---|
| 6,006,242 | A * | 12/1999 | Poole et al. | 715/209 |
| 6,973,656 | B1 * | 12/2005 | Huynh et al. | 719/315 |
| 2003/0011632 | A1 * | 1/2003 | Gupta et al. | 345/747 |
| 2003/0074350 | A1 * | 4/2003 | Tsuda | 707/3 |
| 2004/0030688 | A1 * | 2/2004 | Aridor et al. | 707/3 |
| 2004/0205448 | A1 * | 10/2004 | Grefenstette et al. | 715/500 |
| 2005/0022114 | A1 * | 1/2005 | Shanahan et al. | 715/513 |
| 2005/0234952 | A1 * | 10/2005 | Zeng et al. | 707/101 |
| 2006/0080314 | A1 * | 4/2006 | Hubert et al. | 707/5 |
| 2006/0156220 | A1 * | 7/2006 | Dreystadt et al. | 715/501.1 |
| 2006/0265344 | A1 * | 11/2006 | Woods | 707/1 |
| 2007/0038610 | A1 * | 2/2007 | Omoigui | 707/3 |
| 2008/0091693 | A1 * | 4/2008 | Murthy | 707/100 |
| 2008/0294426 | A1 * | 11/2008 | Evans et al. | 704/9 |
| 2011/0161801 | A1 * | 6/2011 | Harrop et al. | 715/234 |

OTHER PUBLICATIONS

"Dr. Macro's XML Rants", pp. 1-13, printed from htttp://drmacros-xml-rants.blogstpot.com/2006/09/xcmtdmw-why-indirection-is-so.html on Sep. 20, 2007.
XML Inclusions (XInclude) Version 1.0 (Second Edition), pp. 1-23, printed from http://www.w3.org/TR/xinclude on Sep. 20, 2007.
"Microformat", pp. 1-5, printed from http://en.wikipedia.org/wiki/Microformats on Sep. 20, 2007.

* cited by examiner

*Primary Examiner* — Christyann Pulliam
*Assistant Examiner* — Sheryl Holland
(74) *Attorney, Agent, or Firm* — Martin & Associates, LLC; Derek P. Martin

(57) ABSTRACT

A content management system provides a way to detect a change to one part of a document, and to generate a corresponding change in a different part of the same document. Dynamic inclusion rules define conditions that, when satisfied, allow automatically changing a link in a document to a new link when corresponding data in the document is added or changed. If a change corresponds to a defined dynamic inclusion rule, a corresponding query in the rule is evaluated according to the changes in the document. When there is enough information to run the query, the query is automatically executed in a background process. If there is a single link that satisfies the query, the document may be updated with the new link. If multiple links satisfy the query, the top ranked query result may be automatically selected, or the user may select which link should be included in the document.

5 Claims, 9 Drawing Sheets

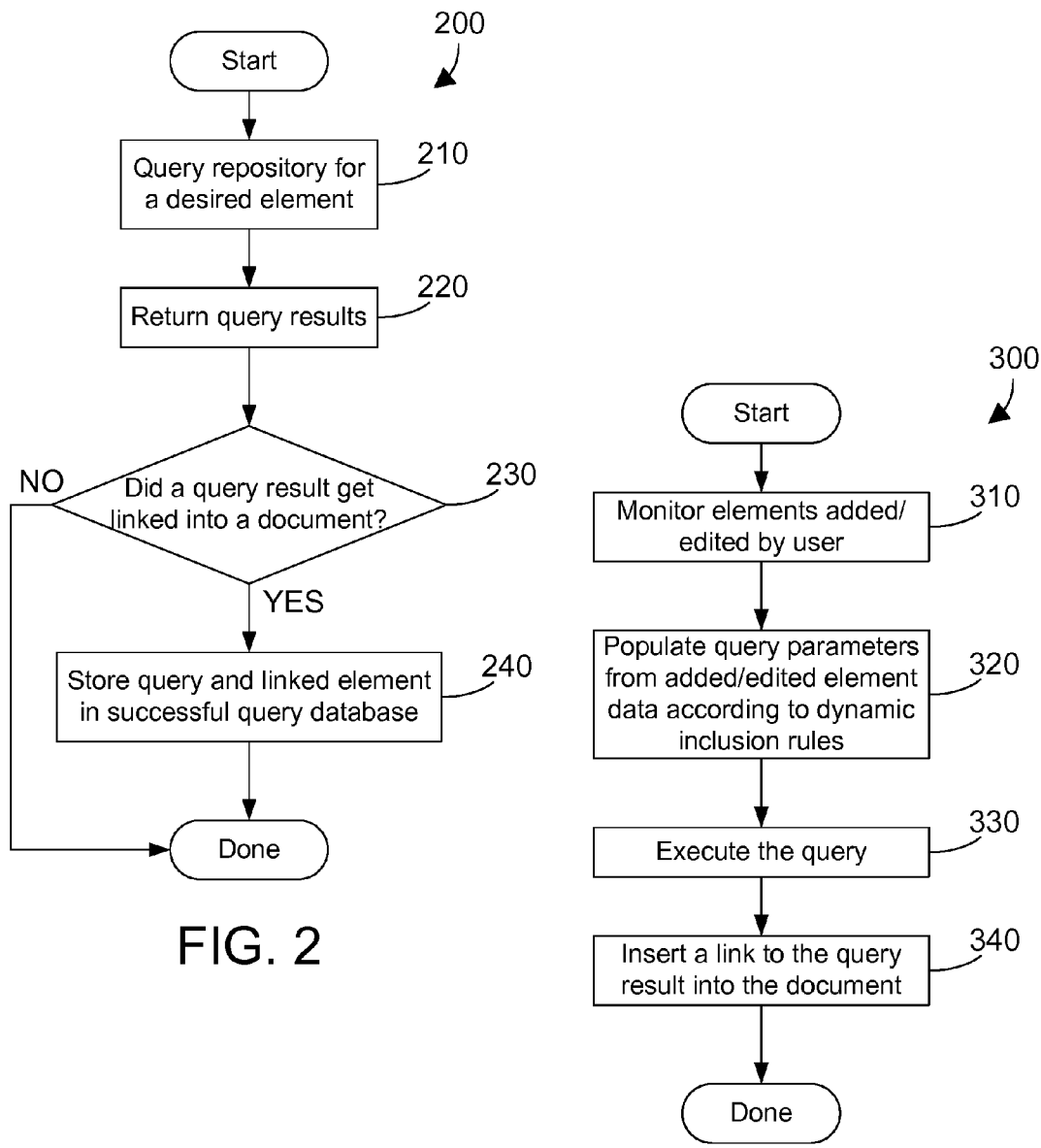

600

```
<DynamicInclusionRules>
      <Rule clearUnmappedParms="true">   ← 610
620 →    <Source xPath="/Label/Name" mapToQueryParm="drug_name"/>
630 →    <Source xPath="/Label/Formula" mapToQueryParm="chemical_formula"/>
640 →    <Target xPath="/Label/Media/MolecularImage/@src" />
         <QueryParms>
               <Condition name="doctype" operator="EQ">
                     <Value val="Label" />
               </Condition>
               <Condition name="format" operator="EQ">
                     <Value val="image/jpeg" />
               </Condition>
               <Condition name="drug_name" operator="EQ">
                     <Value val="" />
               </Condition>
               <Condition name="chemical_formula" operator="EQ">
                     <Value val="" />
               </Condition>
         </QueryParms>
      </Rule>
</DynamicInclusionRules>
```

```
<Label>
      <Name></Name>
      <Formula></Formula>
      <Media>
            <MolecularImage src=""/>
      </Media>
</Label>
```

FIG. 7

```
<Query>
    <Condition name="doctype" operator="EQ">
        <Value val="Label" />
    </Condition>
    <Condition name="format" operator="EQ">
        <Value val="image/jpeg" />
    </Condition>
    <Condition name="drug_name" operator="EQ">
        <Value val="Sneeze Free" />
    </Condition>
    <Condition name="chemical_formula" operator="EQ">
        <Value val="C<sub>19</sub>H<sub>27</sub>ClNNaO<sub>5</sub>S" />
    </Condition>
</Query>
```

```
<Label>
    <Name>Sneeze Free</Name>
    <Formula>C<sub>19</sub>H<sub>27</sub>ClNNaO<sub>5</sub>S</Formula>
    <Media>
        <MolecularImage src="cms_server://obj_id=294829&binding=CURRENT"/>
    </Media>
</Label>
```

```
<Query>
    <Condition name="format" operator="IN">
        <Value val="image/jpeg" />
    </Condition>
    <Condition name="drug_name" operator="EQ">
        <Value val="Sneeze Free" />                    ←—1310
    </Condition>
    <Condition name="chemical_formula" operator="EQ">
        <Value val="C<sub>19</sub>H<sub>27</   ←—1320
sub>ClNNaO<sub>5</sub>S" />
    </Condition>
    <Condition name="active_ingredients" operator="IN">
        <Value val="" />                                ←—1330
    </Condition>
</Query>
```

FIG. 13

```
<Query>
    <Condition name="format" operator="IN">
        <Value val="image/jpeg" />
        <Value val="image/gif" />
    </Condition>
    <Condition name="drug_name" operator="EQ">
        <Value val="Sneeze Free" />                    ←—1410
    </Condition>
    <Condition name="inactive_ingredients" operator="IN">
        <Value val="" />                                ←—1420
    </Condition>
</Query>
```

| obj_id | 294829 |
|---|---|
| drug_name | Sneeze Free |
| chemical_formula | C<sub>19... |

Sneeze Free Molecular Image

FIG. 15

AUTOMATICALLY MAKING CHANGES IN A DOCUMENT IN A CONTENT MANAGEMENT SYSTEM BASED ON A CHANGE BY A USER TO OTHER CONTENT IN THE DOCUMENT

BACKGROUND

1. Technical Field

This disclosure generally relates to content management systems, and more specifically relates to a managing changes to content in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Known content management systems check their rules when content comes into or out of the system. If a rule is satisfied, the CMS may perform subsequent processing on the content. Known content management systems may include rules related to bursting, linking, and synchronization. Bursting rules govern how a document is bursted, or broken into individual chunks, when the document is imported or checked into the repository. By bursting a document into chunks, the individual chunks may be potentially reused later by a different author. Linking rules are used for importing and associating objects related to a CMS document based on particular elements or attributes from the document as specified by the rules. For example, an XML document that references external images can take advantage of linking rules so that relationships between the XML content and the external images are automatically created when the document is imported or checked into the repository. Another kind of linking rule governs what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

In known content management systems, links are static, which means once a link has been created, the semantics of that link do not change unless the user manually updates the link. For example, if a user links to an image in a document that corresponds to the name of the document, and then changes the name of the document, the image will no longer relate to the document. Known content management systems rely on the user to remember the association between the document name and the image, and depend on the user to make corresponding changes to the image link when the document name changes. However, relying on the user to take some action is not desirable, especially when the user is working with a very large document or when in highly regulated environments such as pharmaceutical environments. Without a way to easily specify and automatically check changes to content in a document to see if these changes need to cause corresponding changes to other content in the document, this potential for a mismatch between content in different parts of the same document will continue to plague known content management systems.

BRIEF SUMMARY

A content management system (CMS) provides a way to detect a change to one part of a document, and to generate a corresponding change in a different part of the same document. Dynamic inclusion rules define conditions that, when satisfied, allow automatically changing a link in a document to a new link when corresponding data in the document is added or changed. Changes in a document are monitored. If a change corresponds to a defined dynamic inclusion rule, a query specified in the dynamic inclusion rule is evaluated according to the changes in the document. When there is enough information to run the query, the query is automatically executed in a background process. If there is a single link that satisfies the query, the document may be updated with the new link. If multiple links satisfy the query, the top ranked link may be automatically selected, or a list of ranked links may be presented to the user so the user may select which link should be included in the document. When there is not enough information to run the query, a historical database may be consulted to find similar queries by other users. This database preferably includes data from many different users of the CMS. A ranked list of queries is presented to the user, who selects one of the queries for execution. The query returns a link to a document in the repository, and the document being edited by the user may then be updated to include the link. The result is that changes to one part of the document may automatically propagate needed changes to another part of the document.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a flow diagram of a method for storing in a database successful queries to a repository in a content management system;

FIG. 3 is a flow diagram of a first general method for detecting a change to content in a document, and executing a query to the repository to determine a link to insert into the document;

FIG. 6 shows a sample set of dynamic inclusion rules;

FIG. 7 shows a sample XML document;

FIG. 11 shows the query corresponding to the document shown in FIG. 10 after a user has added content for the Label/Formula element;

FIG. 12 shows the document shown in FIG. 10 after executing the query in FIG. 11 and inserting the link returned from executing the query in FIG. 11;

FIG. 13 shows a first similar query retrieved from the successful query database when the query in FIG. 9 cannot be executed due to a missing parameter;

FIG. 14 shows a second similar query retrieved from the successful query database when the query in FIG. 9 cannot be executed due to a missing parameter; and FIG. 15 is a sample image document residing in the repository.

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

The content management system disclosed herein provides a way to track changes to a source element in a document, and to make a corresponding change to a target element in the same document, such as a link. Dynamic inclusion rules define a data source, a data target, and a corresponding query that may be executed in a background process to determine an appropriate data target when the data source is changed by a user. When the user makes a change to the data source while editing the document, the corresponding query in the dynamic inclusion rule is populated from the changed data in the document, and the query is executed to determine a corresponding link to insert in the document. In this manner different content within a document may be formally related such that a change to one causes an automatic change to the other.

Figure 1:
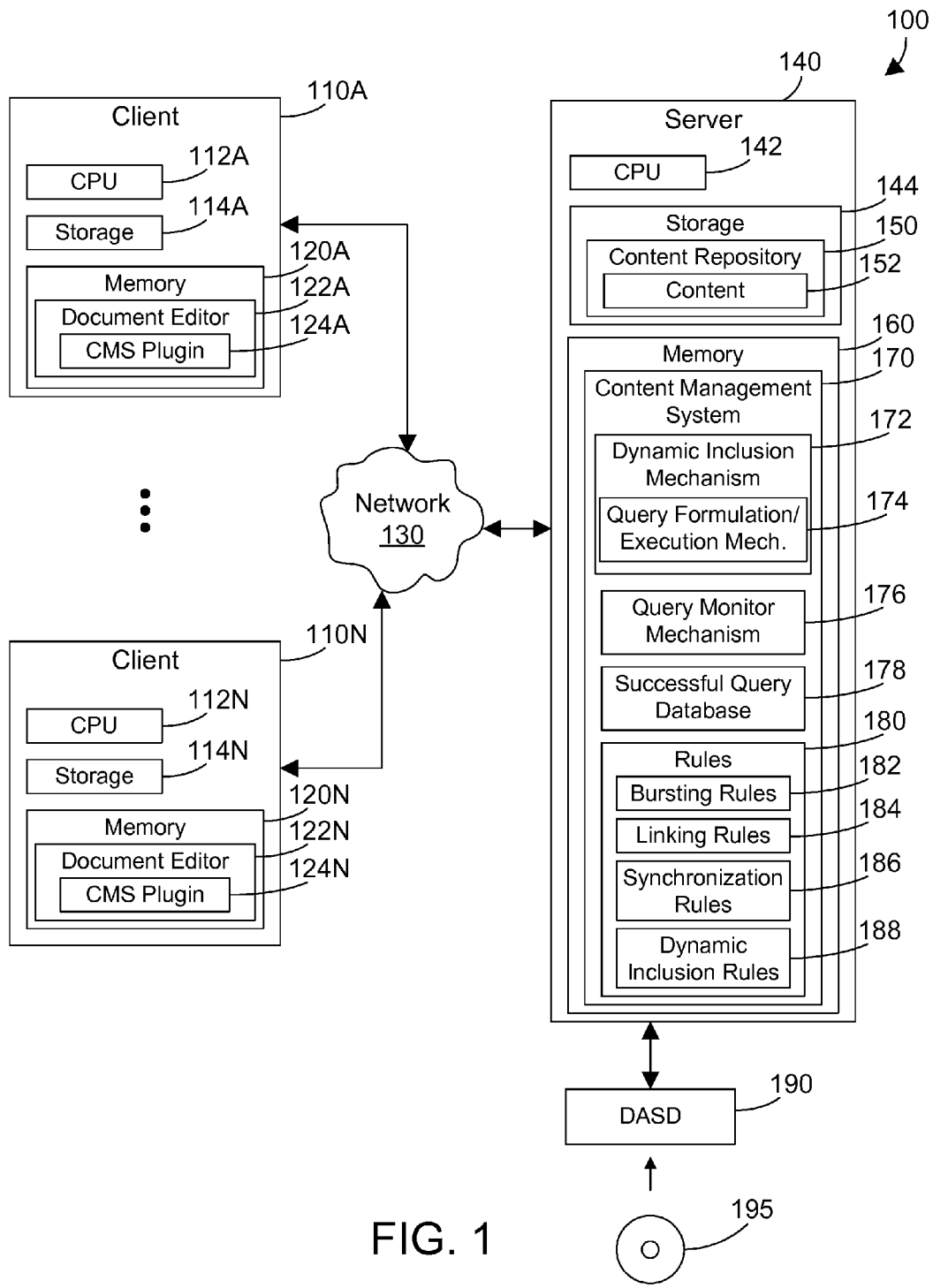
FIG. 1 is a block diagram of a networked computer system that includes a server computer system that has a content management system that includes a dynamic inclusion mechanism that dynamically updates content in a document based on changes to other content in the document.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a dynamic inclusion mechanism 172, a query monitor mechanism 176, a successful query database 178, and rules 180.

Dynamic inclusion mechanism 172 is used to track changes to content in a document, and to make corresponding changes to other content by querying the repository to identify the corresponding changes that are needed to the other content. The detailed function of the dynamic inclusion mechanism 172 will be discussed in more detail below. Dynamic inclusion mechanism 172 includes a query formulation/execution mechanism 174 that formulates a query as the user makes changes to a document, and that automatically queries the repository in a background process for other content that also needs to be changed in the document. Dynamic inclusion mechanism 172 functions according to one or more dynamic inclusion rules 188 that each preferably specify a data source, a data target, and a query to execute when the data source changes to determine a new data target. For example, let's assume a document defines a drug label, and specifies several elements, including a drug name and a link to an image file for the molecular diagram for the drug. Let's further assume a dynamic inclusion rule is defined that specifies the drug name as the data source, the image file for the molecular diagram as the data target, and a query that queries the repository for a link to a new molecular diagram when the data source (i.e., drug name) changes. When a user edits a drug label document, if the user changes the drug name, the dynamic inclusion rule will see the change to the specified data source in the dynamic inclusion rule, will use the new drug name as a parameter for the corresponding query, will execute the query in a background process, and will return a link to the new image corresponding to the new drug name. In response, the dynamic inclusion mechanism 172 dynamically includes the link in the document, thereby maintaining the integrity between the drug name and the corresponding image.

The query monitor mechanism monitors the execution of queries to repository 150, and stores successful queries into successful query database 178. A query is considered successful if one of the query results was linked into a document. Rules 180 include bursting rules 182, linking rules 184, synchronization rules 186, and dynamic inclusion rules 188. Of course, other rules, whether currently known or developed in the future, could also be included in rules 180.

Bursting rules 182, linking rules 184, and synchronization rules 186 are well-known in the art. Dynamic inclusion rules 188 are introduced herein, and contain information that tells the dynamic inclusion mechanism 172 how to make changes to target content based on changes to source content as described generally above and in more detail below. As used in the disclosure and claims herein, the term "document" means any type of data that may be managed by a content management system, including all known types of data and objects as well as those developed in the future, and the term "element" means any section or portion of a document. As used in the disclosure and claims herein, the term "source" is the content that may be modified explicitly by a user or may be modified by the system as a result of synchronization, and the term "target" is the corresponding content that is automatically changed by the dynamic inclusion mechanism 172 when the corresponding "source" content is changed.

While the dynamic inclusion mechanism 172 is shown in FIG. 1 as part of content management system 170 on server computer system 140, one skilled in the art will appreciate that one or more of the features of the dynamic inclusion mechanism 172 could be implemented within a CMS plugin within a document editor on a client computer system, such as within CMS plugin 124A shown in FIG. 1. The disclosure and claims herein expressly extend to any suitable way to allocate different functions between a client and the server that hosts the content management system to achieve a dynamic inclusion mechanism.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Referring to FIG. 2, a method 200 is preferably performed by the query monitor mechanism 176 in FIG. 1, and begins when the repository is queried for a desired element (step 210), and the results from the query are returned (step 220). If at least one of the query results was linked into a document (step 230=YES), then the query and associated element are stored in a database (step 240), such as successful query database 174 in FIG. 1, and method 200 is done. If at least one of the query results was not linked into a document (step 230=NO), then method 200 is done without storing anything into the successful query database. Monitoring which queries are successful in method 200 in FIG. 2 provides helpful data when a query returns multiple possible elements, or when a query has insufficient parameters to run and similar successful queries may provide insight to help the user select an appropriate query to return the desired target element, as discussed below in more detail with reference to FIG. 5.

Referring to FIG. 3, a method 300 for dynamically inserting target content in a document based on a detected change to source content in the document begins with monitoring elements added and edited by a user (step 310). The monitored elements are preferably those elements specified as source elements in a defined dynamic inclusion rule (e.g., 188 in FIG. 1). When a monitored element in a dynamic inclusion rule is added or changed by the user, the corresponding query in the rule is populated with one or more parameters that reflect the addition or change (step 320). The query is then executed (step 330), and a link to the query result is automatically inserted into the document (step 340) to update the data target specified in the dynamic inclusion rule, and method 300 is done.

Figure 4:
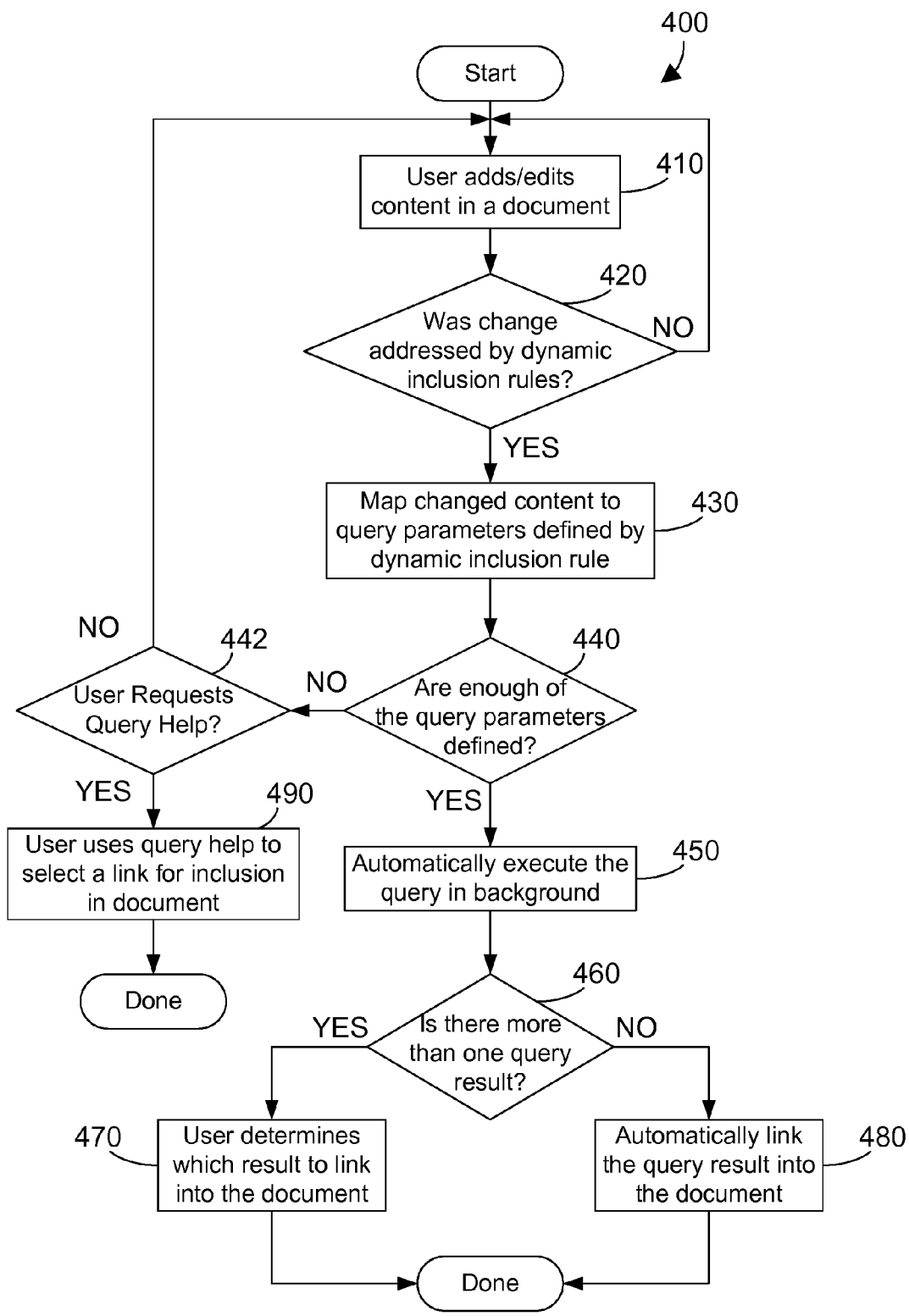
FIG. 4 is a flow diagram of a second more detailed method for detecting a change to content in a document, and executing a query to the repository to determine a link to insert into the document.

FIG. 3 shows a somewhat ideal case when a single data source is specified in a dynamic inclusion rule, and the addition or change in the single data source provides sufficient parameters for the query, which are all that are needed to run the query. FIG. 3 further assumes that executing the query produces a single result, which can then be automatically inserted into the document at the location of the data target. While this is useful in many cases, there are other more complex cases that are not addressed in method 300 in FIG. 3. Referring to FIG. 4, a more detailed method 400 for dynamically inserting target content in a document based on a detected change to source content in the document begins with a user adding or editing content in a document (step 410). If the change made to the content is not defined by dynamic inclusion rules 188 (step 420=NO), then method 400 returns to step 410. If the change made to the content is defined by dynamic inclusion rules 188 (step 420=YES), then the changed content is mapped into query parameters as defined by dynamic inclusion rules 188 (step 430). If not enough of the query parameters are defined to run the query (step 440=NO), and if the user does not request query help (step 442=NO), then method 400 returns to step 410. If enough of the query parameters are defined to run the query (step 440=YES), then the query is automatically executed in a background process (step 450). Note that the determination of when there are enough query parameters to run the query may be made in any suitable way. For example, some query parameters could be specified as essential, some could be specified as desirable, and others as optional. Different subsets might individually be sufficient. For example A and C or B and D. In such a scenario, the query could be run as soon as all essential query parameters are available.

If there is more than one query result (step 460=YES), then the user determines which query result to link into the document (step 470) and method 400 is done. If there is only one query result (step 460=NO), then that query result is automatically linked into the document (step 480) and method 400 is done. If there are not enough of the query parameters defined to execute the query (step 440=NO), and if the user requests query help (step 442=YES), the user uses the query help to select a link for inclusion in the document (step 490), and method 400 is done.

When there is more than one query result (step 460=YES), the data in the successful query database 178 in FIG. 1 may be accessed to rank the multiple query results according to how many times each query result was involved in successful queries in the past. The ranked list may be presented to the user so the user knows the top query result on the list is the top ranked choice. The user may then select one of the query results from the ranked list (step 470), and a link to that query result is included in the document. In the alternative, however, the top ranked query result could also be automatically linked to in the document without user intervention, similar to step 480 shown in FIG. 4.

Figure 5:
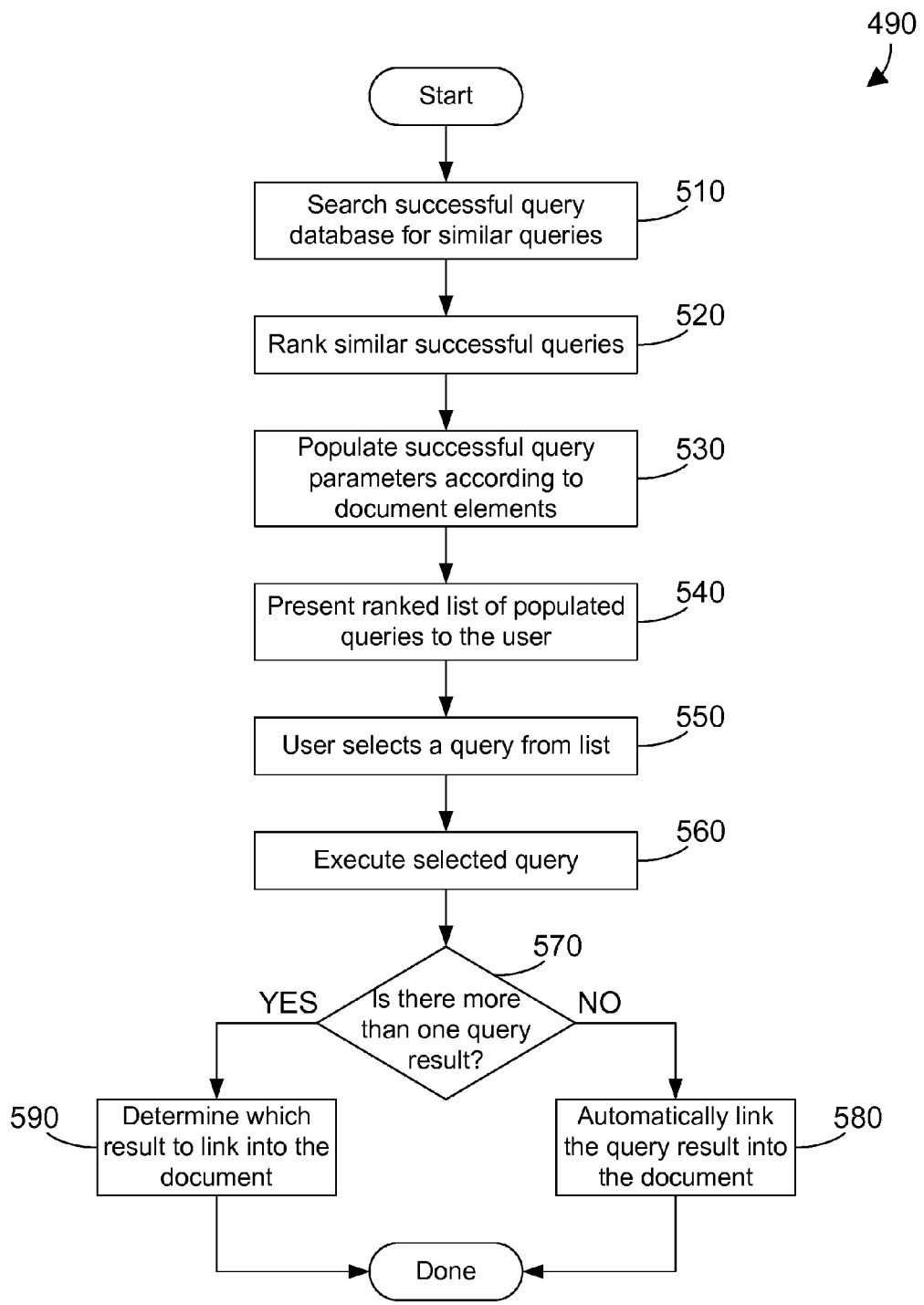
FIG. 5 is a flow diagram of a method that shows one suitable implementation for step 490 in FIG. 4.

Referring to FIG. 5, a method 490 represents one suitable implementation of step 490 in FIG. 4. When the user needs help because the query being assembled in the background has insufficient parameters to run, the user may initiate a search of the successful query database for similar queries (step 510). The similarity of a query may be measured using any suitable metric. Examples of suitable metrics include: role of the user, similarity of document type, similarity of query parameters, similarity in element returned, etc. The similar successful queries are then ranked (step 520). Any suitable criteria or heuristic may be used to rank similar queries. [For example, the heuristic might keep the number of times a query was selected by the user as the correct choice, and this would improve the ranking on a future ranking] The parameters of the similar queries are then populated according to the known data in the document (step 530). The ranked list of populated queries is then presented to the user (step 540). In response, the user selects a query from the list (step 550). The selected query is executed (step 560). If executing the selected query returns more than one query result (step 570=YES), a determination of which query result to use must be made (step 590). One way to select which query to use is for the system to rank the queries and select the highest ranked query. In another implementation, a list is presented to the user, who selects one of the query results to link into the document. If executing the selected query returns a single query result (step 570=NO), the single query result is automatically added as a link in the document (step 580). Note that method 490 in FIG. 4 provides a way to help the user select an appropriate query based on the historical data in the successful query database even when the query in the dynamic inclusion rule does not have sufficient parameters to execute. Once the user selects an appropriate query, the corresponding query result may be added to the document.

Figure 8:
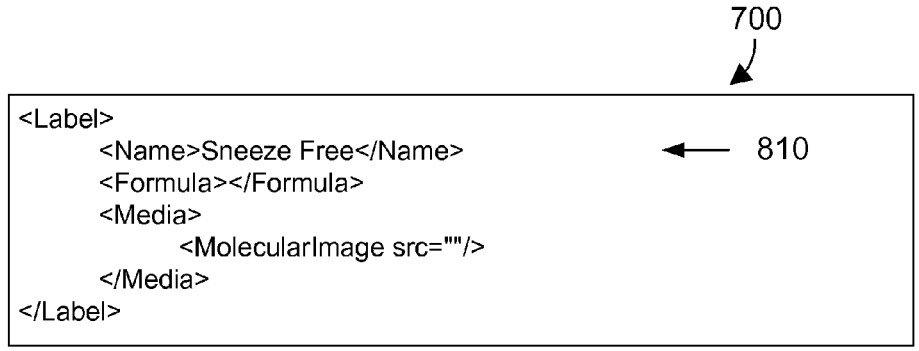
FIG. 8 shows the sample XML document of FIG. 7 after a user has added content for the Label/Name element.
Figure 9:
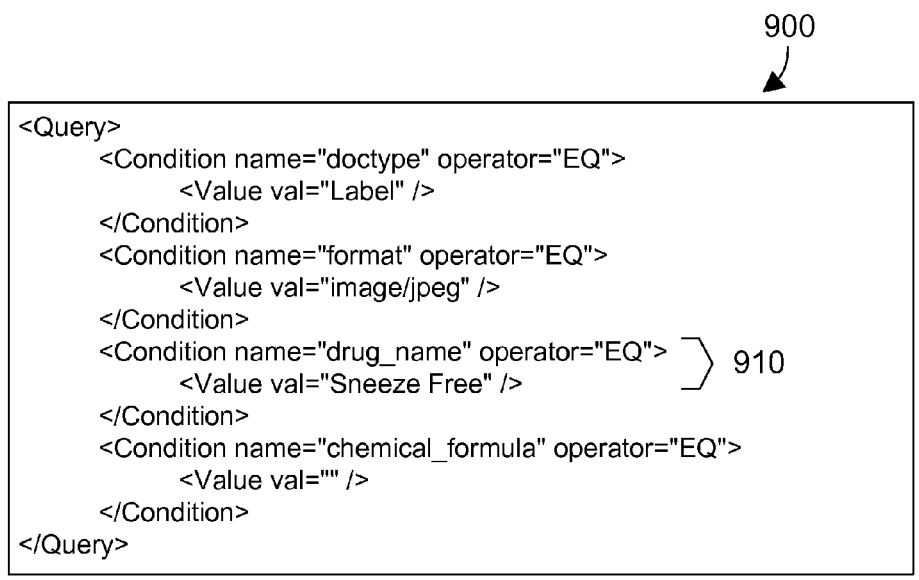
FIG. 9 shows a query corresponding to the document shown in FIG. 7 after a user has added the Label/Name element as shown in FIG. 8.
Figure 10:
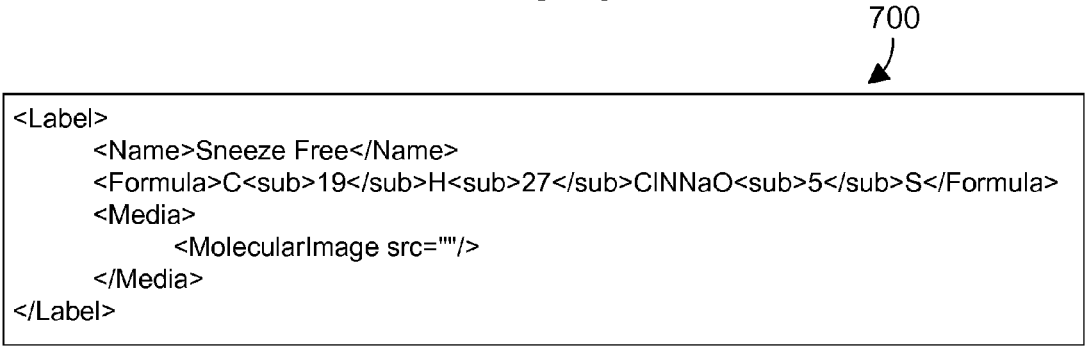
FIG. 10 shows the sample XML document of FIG. 8 after a user has added content for the Label/Formula element.

A simple example is now provided to illustrate many of the concepts described above. FIG. 6 shows sample dynamic inclusion rules 600 that is one suitable example of dynamic inclusion rules 188 in FIG. 1. The clearUnmappedParms attribute, as seen at 610 in FIG. 6, is read by dynamic inclusion mechanism 172 when dynamic inclusion mechanism 172 presents the ranked list of populated queries to the user (step 540 in FIG. 5). If element 610 is FALSE, then values for query parameters that are not mapped by rule 600 are left intact. If element 610 is TRUE, then dynamic inclusion mechanism 172 clears the values for query parameters that are not mapped by rule 600. Notice rule 600 contains more than one data source at 620 and 630, and each data source is mapped to a particular query parameter, shown as QueryParms in rule 600. In the example herein, the first data source is the /Label/Name element, mapped to QueryParm "drug_name" at 620 in FIG. 6. The second data source is the /Label/Formula element, mapped to QueryParm "chemical_formula" at 630 in FIG. 6. The data target is denoted "target" at 640 in FIG. 6, and specifies the "src" attribute of the "MolecularImage" element. This means that the "MolecularImage" element will be dynamically updated when both of the data sources are changed. [0049] FIG. 7 shows a sample XML document before any elements have been added. Note that the document used could be a template or a blank document, and the disclosure and claims herein extend to any document type or setup, whether currently known or developed in the future. FIG. 8 shows document 700 in FIG. 7 after the user has updated the <Name> element to Sneeze Free as shown at 810 (step 410 in FIG. 4). FIG. 9 shows the associated query 900 specified in the dynamic inclusion rules 600 in FIG. 6 that dynamic inclusion mechanism 172 is populating as content is being added and changed in document 700. Since the Label/Name element is a data source defined in the dynamic inclusion rule 600 (step 420=YES in FIG. 4), the changed content is mapped to query parameters defined by dynamic inclusion rule 600 as shown at 910 in FIG. 9 (step 430 in FIG. 4). Notice that query parameter "drug_name" at 910 now has a value of "Sneeze Free" to match the /Label/Name element 810 in document 700 shown in FIG. 8. All of the query parameters are not defined (the chemical_formula parameter in the query is empty; step 440=NO in FIG. 4), so further content is needed. We assume the user does not request query help (step 442=NO in FIG. 4), so method 400 returns to step 410 and continues. We assume the Label/Formula element is then updated as shown in FIG. 10. Because the Label/Formula element is a data source in the dynamic inclusion rule 600 (step 420=YES in FIG. 4), the changed content is mapped to query parameters defined by dynamic inclusion rule 600 as shown in FIG. 11 (step 430 in FIG. 4). Notice that query parameter "chemical_formula" now has a defined value to match the Label/Formula element in document 700 shown in FIG. 10, shown at 1100 in FIG. 11.

All of the data source parameters in query 900 are defined as shown in FIG. 11 (step 440=YES in FIG. 4). Query 900 as shown in FIG. 11 is automatically executed in a background process (step 450 in FIG. 4). We assume FIG. 15 shows a document 1500 in content repository 150 for the example herein. When query 900 as shown in FIG. 11 is executed, we assume element 1500 is returned as the query result. Since there is only one query result (step 460=NO in FIG. 4), a link to the query result is automatically inserted into the document (step 480 in FIG. 4) shown as link 1200 in FIG. 12. This very simple example shows how dynamic inclusion rules may be used to define formal relationships between content in a document such that a change to a specified data source can cause an automatic change to a corresponding data target, thereby maintaining the integrity of related data within a document.

Now we assume the user has entered the drug name Sneeze Free as shown at 810 in FIG. 8, which results in the corresponding query in the dynamic inclusion rules being populated as shown at 900 in FIG. 9, but we assume at this point the user does not know the formula, and therefore needs help to locate the corresponding molecular image. We assume the user requests query help (step 442=YES), which results in executing method 490 in FIG. 5. First, the successful query database is searched (step 510). We assume two similar queries are found, shown in FIGS. 13 and 14. Referring to query 1300 in FIG. 13, since the active_ingredients parameter was not defined by dynamic inclusion rule 600, and dynamic inclusion rule 600 indicates to clear unmapped parameters (clearUnmappedParms="true" at 610 in FIG. 6), dynamic inclusion mechanism 172 automatically removes the value for the active_ingredients parameter. In similar fashion, in query 1400 in FIG. 14, the value for the inactive_ingredients parameter has been removed at 1420. We assume these two similar queries are ranked (step 520), with query 1300 first in rank and query 1400 second in rank. The query parameters are populated from the document elements as shown at 1310 and 1320 in FIG. 13 and 1410 in FIG. 14 (step 530). These two queries are then presented in a ranked list to the user (step 540). The user may then select one of these queries for execution (step 550). The selected query is executed (step 560). If more than one query result is returned (step 570=YES), the system or the user determines which result to link into the document (step 590). If there is only one query result (step 570=NO), a link to the single query result is automatically inserted into the document (step 580). In this manner a user may request query help to locate a suitable query even when the query defined in a dynamic inclusion rule has insufficient parameters to execute.

The disclosure and claims herein present a way to define a formal relationship between one or more source data elements and one or more target data elements, along with query parameters for locating the target data elements when one or more of the source data elements changes. The activity of a user in editing a document is monitored. When a data source defined in a dynamic inclusion rule changes, a corresponding query is populated with data corresponding to the change, and if the query may be executed, the query is executed to identify the corresponding data target. A link to the corresponding data target may then be inserted into the document, thus maintaining the integrity between the defined data source(s) and the defined data target(s) specified in the dynamic inclusion rules.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. A computer-implemented method for automatically making changes in a document in a content management system based on other content in the document that is modified by a user, the method comprising the steps of:
   providing a dynamic inclusion rule separate from the document that specifies at least one relationship between a data source in the document and a data target in the document and that specifies a corresponding query to a repository managed by the content management system to execute when the data source in the document changes;
   monitoring the document for changes to the data source specified in the dynamic inclusion rule;
   when the data source in the document is changed, and when all parameters for the query are available to execute the query, performing the steps of:
      automatically executing the query in a background process, wherein the query includes at least one parameter corresponding to the changed data source, the query returning a query result;
      automatically inserting a link to the query result at the data target in the document;
   when the data source in the document is changed, and when not all parameters for the query are available to execute the query, performing the steps of:
      determining from a successful query database that stores successful queries for elements in the repository a plurality of related queries;
      presenting a list of the related queries to a user who selects one of the related queries for execution;
      executing the selected query; and
      automatically inserting the results of executing the selected query at the data target in the document.

2. The method of claim 1 further comprising the step of storing successful queries for elements in the repository in a successful query database.

3. The method of claim 2 wherein if the query returns a plurality of query results, ranking the query results using data in the successful query database, and selecting the top ranked query result for insertion into the document.

4. The method of claim 1 wherein if the query returns a plurality of query results, notifying a user to select which query result is inserted into the document at the data target.

5. A computer-implemented method for automatically making changes in a document in a content management system based on other content in the document that is modified by a user, the method comprising the steps of:

defining a plurality of dynamic inclusion rules separate from the document that each indicate how a change to a data source in the document affects a data target in the document and that each specify a query corresponding to the data target;

a user changing a data source in the document referenced in a selected one of the dynamic inclusion rules;

in response to the user changing the data source in the document referenced in a selected one of the dynamic inclusion rules, performing the steps of:

populating the query in the selected dynamic inclusion rule, wherein the query includes at least one parameter corresponding to the changed data source;

if the populated query is sufficiently populated to allow execution of the populated query, executing the populated query;

if executing the populated query returns only a first query result, inserting at the data target in the document a link to the first query result;

if executing the populated query returns a plurality of query results, performing the steps of:

presenting a list of multiple query results to the user;

allowing the user to select a second query result from the list; and inserting at the data target in the document a link to the second query result;

if the populated query is not sufficiently populated to allow execution of the populated query, performing the steps of:

searching a successful query database for similar successful queries;

ranking the similar successful queries based on frequency of use of each successful query in the successful query database;

populating the similar successful queries with parameters from document elements;

presenting a list of populated successful queries to the user;

the user selecting from the list a selected query to execute;

executing the selected query to return a third query result; and inserting at the data target in the document a link to the third query result.

\* \* \* \* \*